US008594680B2

(12) United States Patent  (10) Patent No.: US 8,594,680 B2
Ledlie et al.  (45) Date of Patent: Nov. 26, 2013

(54) METHODS, APPARATUSES AND COMPUTER PROGRAM PRODUCTS FOR PROVIDING A PRIVATE AND EFFICIENT GEOLOCATION SYSTEM

(75) Inventors: Jonathan Ledlie, Cambridge, MA (US); Jun-geun Park, Cambridge, MA (US)

(73) Assignees: Nokia Corporation, Espoo (FI); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/028,742

(22) Filed: Feb. 16, 2011

(65) Prior Publication Data

US 2012/0208500 A1   Aug. 16, 2012

(51) Int. Cl.
*H04W 40/00*   (2009.01)
(52) U.S. Cl.
USPC ........................................... 455/445
(58) Field of Classification Search
USPC .......... 455/456.1, 456.6, 456.5, 456.2, 435.1, 455/456.3; 370/216, 338, 332, 335; 707/770
See application file for complete search history.

(56) References Cited

U.S. PATENT DOCUMENTS

| 6,700,534 | B2 | 3/2004 | Harris | |
| 7,397,424 | B2 | 7/2008 | Houri | |
| 2007/0026870 | A1* | 2/2007 | Spain et al. | 455/456.1 |
| 2007/0133487 | A1* | 6/2007 | Wang et al. | 370/338 |
| 2010/0039929 | A1* | 2/2010 | Cho et al. | 370/216 |
| 2010/0127887 | A1 | 5/2010 | Ledlie et al. | |
| 2011/0099200 | A1* | 4/2011 | Blount et al. | 707/770 |
| 2011/0269479 | A1 | 11/2011 | Ledlie et al. | |
| 2011/0306354 | A1 | 12/2011 | Ledlie et al. | |

OTHER PUBLICATIONS

International Searching Authority, International Search Report and Written Opinion for International Application No. PCT/FI2012/050145, mailed May 24, 2012, 13 pages, National Board of Patents and Registration of Finland, Finland.
Teller, S., et al., "Organic Indoor Location Discovery", Computer Science and Artificial Intelligence Laboratory Technical Report, vol. 075, Dec. 30, 2008, 16 pages, MIT-CSAIL, USA.
Kido, H., et al., "Protection of Location Privacy Using Dummies for Location-Based Services", 21st International Conference on Data Engineering Workshops, Apr. 5-8, 2005, 7 pages, IEEE, USA.
Caceres, et al., "Virtual Individual Servers as Privacy-Preserving Proxies for Mobile Devices," MobiHeld '09 Proceedings of the 1st ACM workshop on Networking, systems, and applications for mobile handhelds, Aug. 17, 2009, 6 pages, ACM, USA.

(Continued)

*Primary Examiner* — Kiet Doan
(74) *Attorney, Agent, or Firm* — Alston & Bird LLP

(57) ABSTRACT

An apparatus for preserving privacy of a determined location (s) of a device may include a processor and memory storing executable computer code causing the apparatus to at least perform operations including receiving a request for determining a location of a device based on received fingerprint data corresponding to a summary of radio information identifying a physical place, location, area, or region. The summary based on information received from radio frequency (RF) devices. The computer program code may further cause the apparatus to determine whether fingerprint data associated with a geographical location of the RF devices is stored locally for determining whether to request a network device to determine the location of the device based on providing the network device with fingerprint data and false fingerprint data relating to a location(s) that does not correspond to a current location of the device. Corresponding methods and computer program products are also provided.

22 Claims, 6 Drawing Sheets

(56) References Cited

OTHER PUBLICATIONS

Gedik, et al., "Location Privacy in Mobile Systems: A Personalized Anonymization Model," Proceedings of 25th IEEE International Conference on Distributed Computing Systems, 2005, 10 pages, IEEE, USA.

Bhasker, et al., "Employing User Feedback for Fast, Accurate, Low-Maintenance Geolocating," Proceedings of the Second IEEE International Conference on Pervasive Computing and Communications, 2004, 10 pages, IEEE, USA.

Bolliger, "Redpin—Adaptive, Zero-Configuration Indoor Localization Through User Collaboration," Proceedings of the first ACM international workshop on Mobile entity localization and tracking in GPSless environments, Sep. 19, 2008, 6 pages, ACM, USA.

Griswold, et al. "ActiveCampus—Experiments in Community-Oriented Ubiquitous Computing," IEEE Computer Society, Oct. 2004, 8 pages, vol. 37, Issue 10, IEEE, USA.

Park, et al., "Growing an Organic Indoor Location System," Proceedings of the 8th international conference on Mobile systems, applications, and services, Jun. 15-18, 2010, 14 pages, ACM, USA.

Park, et al., "Implications of Device Diversity for Organic Localization," Proceedings of $30^{th}$ IEEE International Conference on Computer Communications, Apr. 10-15, 2011, 9 pages, IEEE Communications Society, China.

* cited by examiner

METHODS, APPARATUSES AND COMPUTER PROGRAM PRODUCTS FOR PROVIDING A PRIVATE AND EFFICIENT GEOLOCATION SYSTEM

An example embodiment of the invention relates generally to geolocation of communication devices and more particularly, relates to a method, apparatus, and computer program product for preserving the privacy of locations of communication devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to geolocation services of communication devices. These geolocation services may be utilized to determine current locations of communication devices in the real-world. For a variety of reasons, it may be beneficial for a communication device to determine its current location. For example, applications of a communication device may request the current location of the communication device to enhance one or more services provided by the applications. Additionally, for example, the user of the communication device may desire to know the current location.

At present, most outdoor location systems use a Global Positioning System (GPS) which may compute a location of a communication device by triangulating distance to a set of satellites. However, GPS may only function well in outdoor regions with substantial sky visibility. For instance, a communication device may utilize a radio receiver for receiving GPS transmissions from satellites to estimate the current location of the communication device. However, it may be difficult for the communication device to receive the transmissions from the satellites in an indoor environment or in urban areas, for example. The difficulty in receiving the transmissions from the satellites in some instances may negatively impact the ability of the communication device to determine its current location. As such, alternative approaches may be utilized for detecting a current location of a communication device in instances in which GPS may be limited.

An example of an alternative approach for determining a current location of a communication device relates to analyzing radio frequency (RF) signals of wireless access points or signals from cellular towers. In this regard, for example, a communication device may detect signals received from one or more access points or cellular towers in an area of the communication device and the communication device may provide the data associated with the detected signals to a positioning system. The positioning system may analyze the data of the detected signals to estimate a current location for the communication device.

One problem with this approach of determining the location of a communication device is that it may not adequately preserve the privacy of a user of the communication device. For instance, by analyzing the data associated with the received signals from a communication device, a positioning system may be able to track locations of a user. However, there may be instances in which the user of the communication device desires that the information associated with the locations of the user remain private or at least to minimize access to the location information.

In view of the foregoing drawbacks, it may be beneficial to provide an efficient and reliable mechanism of determining one or more locations of a communication device and for more reliably preserving the privacy of the locations of the user.

BRIEF SUMMARY

A method, apparatus and computer program product are therefore provided for preserving the privacy of a user and determining one or more locations of a communication device. In this regard, a communication device may send a request to a dedicated network device. The request may include data requesting a current location of the communication device. The request may also include fingerprint data which may correspond to a generated summary of radio information identifying a physical place, location, area, region, or the like. The summarized radio data may be generated by the communication device based on detected signals from one or more radio frequency (RF) devices (e.g., access points, cellular towers, and the like).

The dedicated network device may analyze data of the received fingerprint to determine whether a memory of the dedicated network device includes information that matches or corresponds to the information related to the received fingerprint. In an instance in which the dedicated network device determines a match or corresponding data, the dedicated network device may determine a location of the communication device and may provide the communication device with the determined location. On the other hand, in an instance in which the dedicated network device determines that its memory does not store data matching or corresponding to the received fingerprint data, the dedicated network device may send a request to one or network entities for determining the location of the communication device. The dedicated network device may include the fingerprint data received from the communication device in the request along with false fingerprint data that does not correspond to a current location of the communication device.

In this regard, the dedicated network device may receive the determined location of the communication device that corresponds to the fingerprint data received by the communication device and the locations that do not correspond the current location of the communication device that are based on the false fingerprint data. The dedicated network device may send the communication device the determined current location and may discard the locations that do not correspond to the current location of the communication device. By sending the network entities the false fingerprint data along the with the fingerprint data received by the communication device, an example embodiment may obscure or hide the location of the communication device. As such, the network entities may be unable to track locations of the user of the communication device.

An example embodiment may also independently and privately manage fingerprint data acquisition and sharing of fingerprint data between users. The shared fingerprint data may be used to determine locations of communications devices. An example embodiment may manage the sharing of user-provided fingerprint data according to a specified request of a user. In this regard, a user may specify that only designated people in his/her social network or one or more individuals identified in a contact list of a communication device may access and utilize fingerprint data of a communication device of the user. In this regard, a dedicated network device of a user may communicate with another dedicated network device of a user of another communication device to exchange designated fingerprint data. The dedicated network devices may utilize this shared fingerprint data in determining locations on behalf of a corresponding communication device.

In one example embodiment, a method for preserving privacy of a determined location(s) of a device is provided. The method may include receiving a request to determine a location of a device based in part on fingerprint data received from the device. The fingerprint data may correspond to a generated summary of radio information identifying at least one of a physical place, a location, an area, or a region. The summary may be based in part on information received from one or more radio frequency devices. The method may further include evaluating the received fingerprint data and determining whether corresponding fingerprint data associated with at least one geographical location of the radio frequency devices is stored locally in order to determine whether to request a network device to determine the location of the device. The determination regarding whether to request the network device to determine the location of the device may be based on providing the network device with the received fingerprint data and false fingerprint data that relates to one or more locations that do not correspond to a current location of the device.

In another example embodiment, an apparatus for preserving privacy of a determined location(s) of a device is provided. The apparatus may include a processor and a memory including computer program code. The memory and computer program code are configured to, with the processor, cause the apparatus to at least perform operations including receiving a request to determine a location of a device based in part on fingerprint data received from the device. The fingerprint data may correspond to a generated summary of radio information identifying at least one of a physical place, a location, an area, or a region. The summary may be based in part on information received from one or more radio frequency devices. The computer program code may further cause the apparatus to evaluate the received fingerprint data and determine whether corresponding fingerprint data associated with at least one geographical location of the radio frequency devices is stored locally in order to determine whether to request a network device to determine the location of the device. The determination regarding whether to request the network device to determine the location of the device may be based on providing the network device with the received fingerprint data and false fingerprint data that relates to one or more locations that do not correspond to a current location of the device.

In another example embodiment, a computer program product for preserving privacy of a determined location(s) of a device is provided. The computer program product includes at least one computer-readable storage medium having computer-readable program code portions stored therein. The computer-executable program code instructions may include program code instructions configured to cause receipt of a request to determine a location of a device based in part on fingerprint data received from the device. The fingerprint data may correspond to a generated summary of radio information identifying at least one of a physical place, a location, an area, or a region. The summary may be based in part on information received from one or more radio frequency devices. The program code instructions may also evaluate the received fingerprint data and determine whether corresponding fingerprint data associated with at least one geographical location of the radio frequency devices is stored locally in order to determine whether to request a network device to determine the location of the device. The determination regarding whether to request the network device to determine the location of the device may be based on providing the network device with the received fingerprint data and false fingerprint data that relates to one or more locations that do not correspond to a current location of the device.

An embodiment of the invention may provide a better user experience since the privacy of the locations of a communication device of a user may be preserved. Additionally, the user may be able to specify location data to share with chosen individuals. As a result, device users may enjoy improved capabilities with respect to location based services accessible via the device, while minimizing the concern of being tracked by location service providers.

BRIEF DESCRIPTION OF THE SEVERAL VIEWS OF THE DRAWINGS

Figure 1:
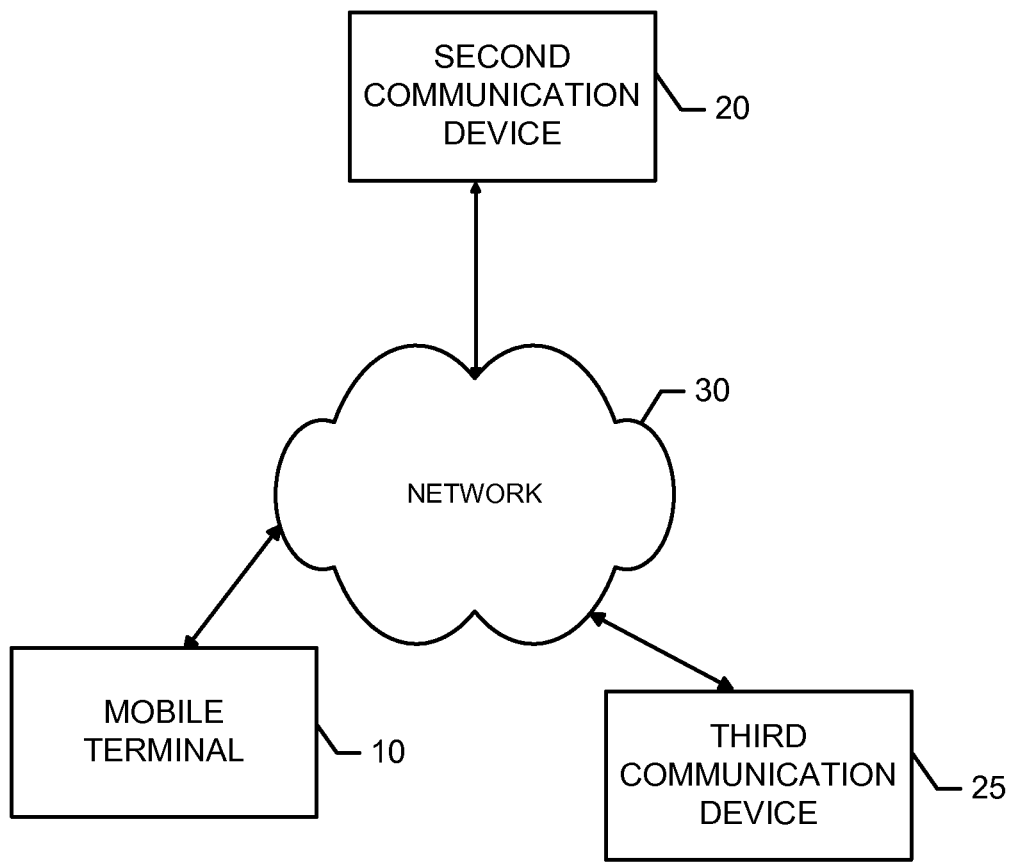
Figure 2:
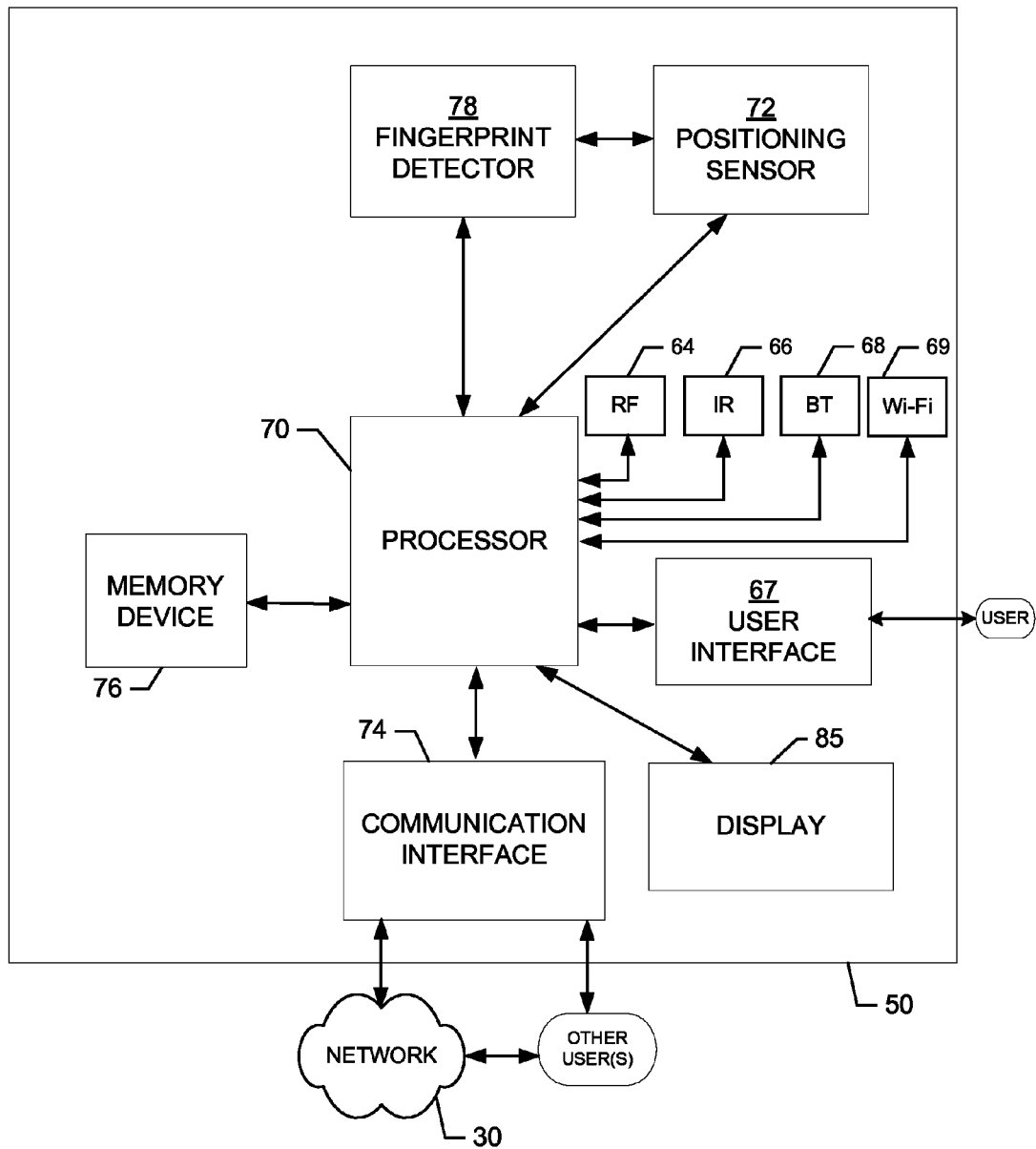
Figure 3:
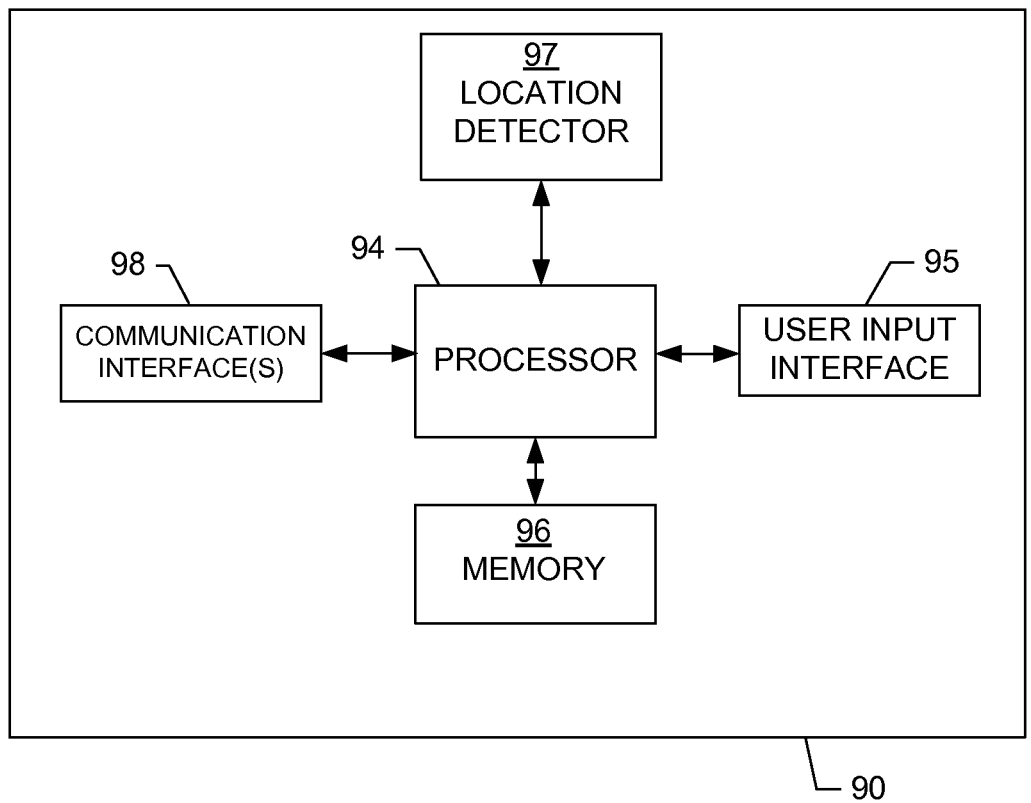
Figure 4:
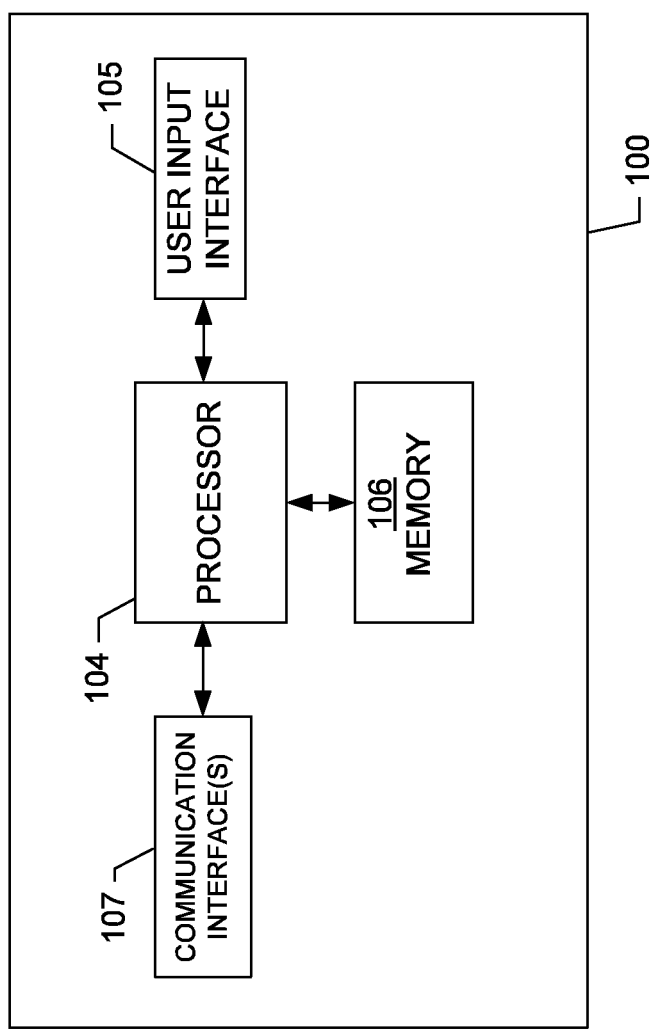
Figure 5:
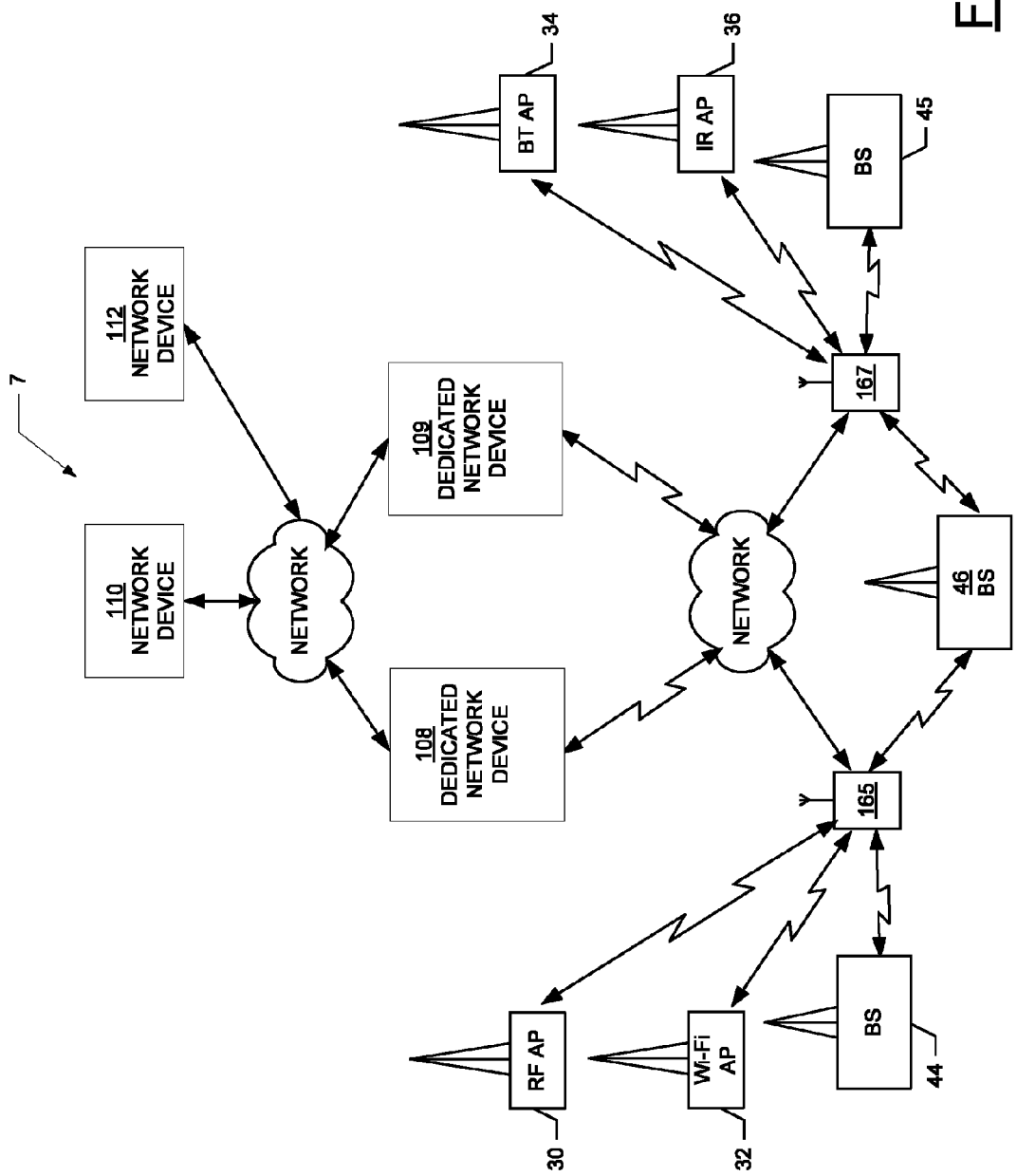
Figure 6:
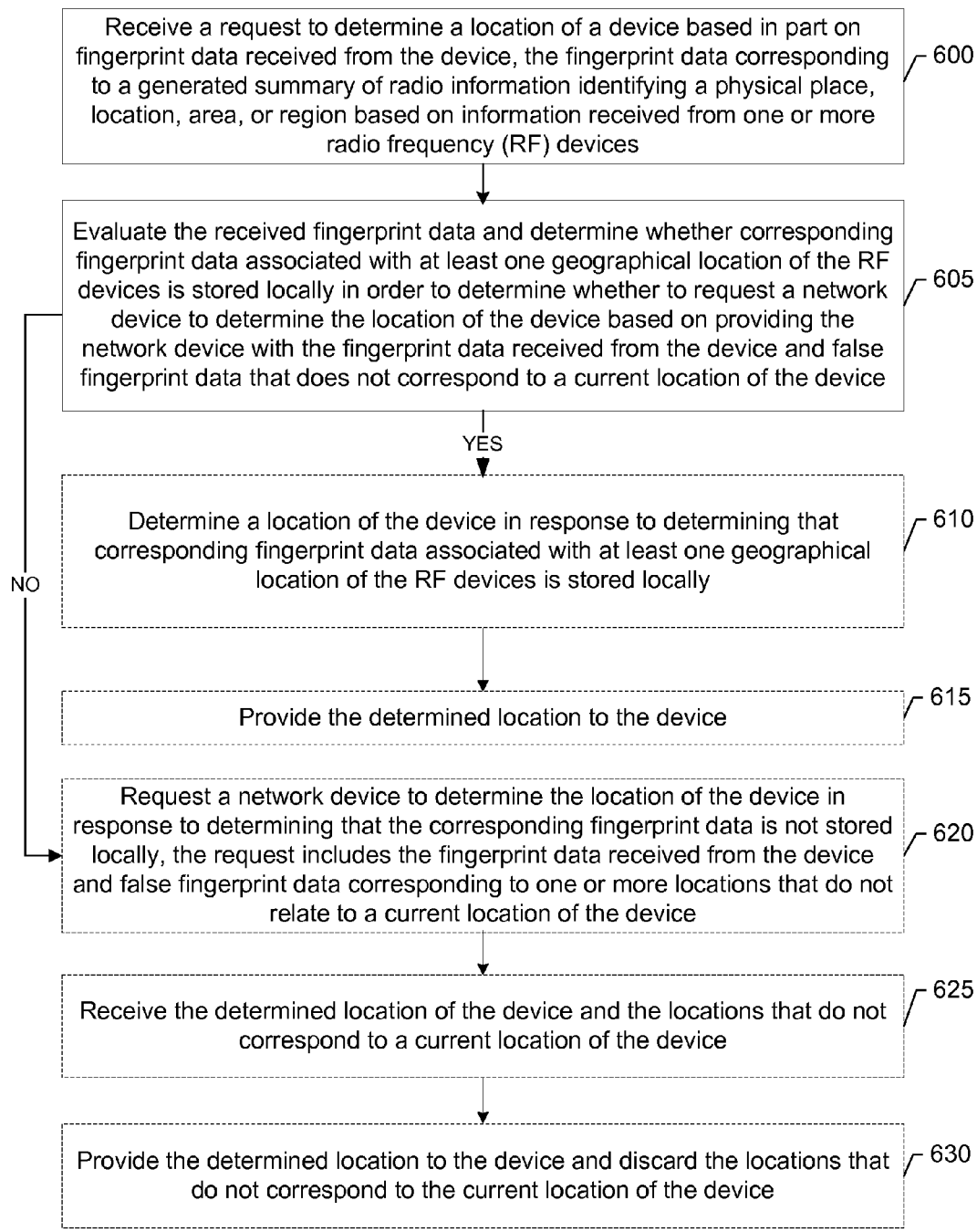

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of a network device for preserving privacy of a user and determining one or more locations of an apparatus according to an example embodiment of the invention;

FIG. 4 is a schematic block diagram of a network entity according to an example embodiment of the invention;

FIG. 5 is a block diagram of a system according to an example embodiment of the invention; and FIG. 6 illustrates a flowchart for preserving privacy of a user and determining one or more locations of an apparatus according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a fingerprint(s), fingerprint data or the like may refer to one or more summaries of radio information (e.g., ambient radio information), signals or the like that may, but need, not uniquely identify a physical place(s), location(s), area(s), region(s) or the like.

As such, as referred to herein, false fingerprint data, fake fingerprint data, bogus fingerprint data or the like may be referred to interchangeably to correspond to valid fingerprint data but may relate to fingerprint data that does not correspond to a current location of a communication device.

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

FIG. 2 illustrates a schematic block diagram of an apparatus for detecting fingerprint data and receiving location information based in part on the detected fingerprint data. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, a fingerprint detector 78 and a positioning sensor 72. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). The memory device 76 may also store data received from one or more radio frequency devices (e.g., access points (e.g., Wi-Fi access points, RF access points, BT access points, IR access points, etc.) and/or cellular towers (e.g., base stations)).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/ or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

As shown in FIG. 2, the apparatus 50 may also include one or more means for sharing and/or obtaining data. For example, the apparatus may comprise a short range radio frequency (RF) transceiver and/or interrogator 64 so data may be shared with and/or obtained from electronic devices (e.g., a RF access point(s)) in accordance with RF techniques. The apparatus may comprise other short range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be configured to operate according to Wibree™ radio standards. The apparatus 50 may also include a Wi-Fi transceiver 69 configured to transmit and/or receive data from electronic devices (e.g., a Wi-Fi access point(s)) according to a Wireless Fidelity (Wi-Fi) technique. In this regard, the apparatus 50 and, in particular, the short range transceiver may be capable of transmitting data to and/or receiving data from electronic devices (e.g., an IR access point(s), a BT access point(s)) within a proximity of the apparatus, such as within 10 meters, for example. Although not shown, the apparatus 50 may be configured to transmit and/or receive data from electronic devices according to various wireless networking techniques, including WLAN techniques such as IEEE 802.11 techniques, and/or the like.

In addition, the apparatus 50 may include a positioning sensor 72. The positioning sensor 72 may include, for example, a global positioning system (GPS) sensor, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory of the apparatus 50 or to another memory device to be stored as a position history or location information. In this regard, for example, the position history may define a series of data points corresponding to positions or locations of the apparatus 50 at respective times. Various events or activities of the apparatus 50 may also be recorded in association with position history or location information provided by the positioning sensor 72.

In an example embodiment, the processor 70 may be embodied as, include or otherwise control the fingerprint detector. The fingerprint detector 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the fingerprint detector 78, as described below. Thus, in an example in which software is employed, a device or circuitry (e.g., the processor 70 in one example) executing the software forms the structure associated with such means.

The fingerprint detector 78 may facilitate detection of a location of the apparatus 50 based in part on providing data associated with one or more received signals from one or more RF devices (e.g., access points and/or one or more cellular towers) to a network device, as described more fully below. For purposes of illustration and not of limitation, the fingerprint detector 78 may, but need not, facilitate detection of a location of the apparatus 50 in an instance in which GPS may be unavailable or imprecise for determining a current location of the apparatus 50. For example, GPS may be, but need not be, unavailable or imprecise for determining the location of apparatus 50 in an instance in which the apparatus 50 is located indoors, located in an urban area or in any other instance in which signals from GPS satellites may be weak or may be difficult to receive by the positioning sensor 72.

The fingerprint detector 78 may detect signals received from one or radio frequency (RF) devices, including but not limited to one or more access points such as, for example, RF access points, Wi-Fi access points, BT access points, IR access points. The RF devices may also include but are not limited to one or more cellular towers (e.g., base stations 44, 45, 46 of FIG. 5). In an example embodiment, the fingerprint detector 78 may receive detected signals from one or more RF access points (e.g., RF access point 30 of FIG. 5) and one or more Wi-Fi access points (e.g., Wi-Fi access point 32 of FIG. 5), via the RF transceiver 64 and the Wi-Fi transceiver 69, respectively. Additionally, the fingerprint detector 78 may receive detected signals from one or more BT access points (e.g., BT access point 34 of FIG. 5) and one or more IR access points (e.g., IR access point 36 of FIG. 5) via the BT transceiver 68 and IR transceiver 66, respectively. The fingerprint detector 78 may detect the signals received from one or more access points when the apparatus 50 is within a proximity or range of the access points. The detected signals from the access points may include, but is not limited to, data indicating the received signal strength of the signals detected from the access points, one or more network addresses, or other identifiers identifying a corresponding access point(s), and any other suitable data.

As described above, the fingerprint detector 78 may also detect signals from one or more cellular towers (e.g., base stations 44, 45, 46 of FIG. 5). The fingerprint detector 78 may detect signals from the cellular towers in an instance in which the apparatus 50 is within a range of the cellular towers. The range may be the range within which the apparatus 50 may reliably connect to one or more of the cellular towers. The data of the signals received from one or more of the cellular towers may include, but is not limited to, the received signal strength of signals received from respective cellular towers, data identifying (e.g., a cell tower identifier (ID) (e.g., a base station ID)) a respective cellular tower, and any other suitable information.

The data (also referred to herein as fingerprint data or the like) associated with the signals of the access points and/or the cellular towers by the fingerprint detector 78, may be sent to a network device (e.g., network device 90 of FIG. 3) and the network device may utilize the data to determine a current location of the apparatus 50. The determined current location may be provided to the fingerprint detector 78, as described more fully below.

Referring now to FIG. 3, a block diagram of one example of a network device is provided. The network device 90 may be a dedicated network device that is dedicated to serving a particular apparatus 50. As such, in one example embodiment, services (e.g., location services) provided by the network device 90, may not be shared with another apparatus 50. In another example embodiment, services (e.g., location services) provided by the network device 90 may be shared with another apparatus 50 based on an indication of a request by a user to share services. As shown in FIG. 3, the network device (e.g., a server (e.g., communication device 20)) generally includes a processor 94 and an associated memory 96. The memory 96 may comprise volatile and/or non-volatile memory, and may store content, data and/or the like. For example, the memory may store content, data, information, and/or the like transmitted from, and/or received by, the network device. Also for example, the memory 96 may store client applications, instructions, and/or the like for the processor 94 to perform the various operations of the network device in accordance with an embodiment of the invention, as described herein.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an example embodiment, the processor 94 may be embodied as, include or otherwise control the location detector 97. The location detector 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the location detector 97, as described below. Thus, in an example in which software is employed, a device or circuitry (e.g., the processor 94 in one example) executing the software forms the structure associated with such means.

The location detector 97 may receive a request from the fingerprint detector 78 of apparatus 50 to determine a current location of the apparatus 50. The request may also include fingerprint data associated with detected signals corresponding to access points and/or cellular towers in one or more areas of the apparatus 50. The location detector 97 may analyze the received signal strengths of the of the detected signals of the data, the network addresses or other identifiers of the access points and cellular tower identifiers (e.g., base station identifiers) of the data to determine whether there is information associated with matching or corresponding access points and cellular towers stored in the memory 96 of the network device 90. In an instance in which the location detector 97 determines that there is data associated with one or more matching access points and cellular towers stored in the memory 96, the location detector 97 may analyze geographical location data associated with the matching or corresponding access points and cellular towers to determine or estimate a location (e.g., current location) of the apparatus 50. In this regard, the location detector 97 may also provide the fingerprint detector 78 with estimated location of the apparatus 50.

On the other hand, in an instance in which the location detector 97 determines that there is no information in the memory 96 that matches or corresponds to the access points and/or cellular towers identified in the fingerprint data received from the fingerprint detector 78, the location detector 78 may provide the fingerprint data to one or more network entities in a request. In an example embodiment, the location detector 97 may include false fingerprint data along with the fingerprint data received (e.g., also referred to herein as legitimate fingerprint data) from the fingerprint detector 78 and may request one or more of the network entities to determine locations corresponding to the legitimate fingerprint data and the false fingerprint data included in the request by the network device 90. The false fingerprint data may, but need not, correspond to a number (e.g., four) of previously determined locations. As such, as referred to herein, false fingerprint data may correspond to valid fingerprint data but may relate to fingerprint data that does not correspond to a current location of an apparatus 50. By including false fingerprint data in the request, the network device 90 may obscure or hide the true location of the apparatus 50 to the network entities, which may preserve the privacy of the user of the apparatus 50, since the network entities may be unable to track the true location of the apparatus 50.

It should be pointed out that the location detector 97 may obscure the current location of an apparatus 50 by generating random requests that may be sent to one or more network entities for determining locations of an apparatus 50. The random requests may include false fingerprint data and may be sent to the network devices by the location detector 97 even in an instance in which the apparatus 50 may not request determination of its location. In this regard, the location detector 97 may generate queries for determining locations based on false fingerprint data across time (e.g., randomly) as well as space (e.g., an instance(s) in which the apparatus 50 requests determination of its location).

In response to the location detector 97 receiving the location information corresponding to the legitimate fingerprint data and the false fingerprint data, the location detector 78 may discard the location information associated with the locations corresponding to the false fingerprint data and may provide the determined location corresponding to the legitimate fingerprint data to the fingerprint detector 78 of the apparatus 50. The location information corresponding to the legitimate fingerprint data may correspond to the estimated or determined location (e.g., a current location) of the apparatus 50.

Referring now to FIG. 4, a block diagram of an example embodiment of a network entity is provided. As shown in FIG. 4, the network entity (e.g., a server) generally includes a processor 104 and an associated memory 106. The memory 106 may comprise volatile and/or non-volatile memory, and may store content, data and/or the like. The memory 106 may store client applications, instructions, and/or the like for the processor 104 to perform the various operations of the network entity 100.

The processor 104 may also be connected to at least one communication interface 107 or other means for displaying, transmitting and/or receiving data, content, and/or the like. The user input interface 105 may comprise any of a number of devices allowing the network entity 100 to receive data from a user, such as a keypad, a touch display, a joystick or other input device. In this regard, the processor 104 may comprise user interface circuitry configured to control at least some functions of one or more elements of the user input interface. The processor 104 and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The network entity 100 may receive one or more requests from a device (e.g., a location detector 97 of the network device 90 in one embodiment) for location information associated with received fingerprint data. The information received in the request may correspond to legitimate fingerprint data corresponding to a current location of an apparatus 50 and may correspond to false fingerprint data that may not correspond to a current location of the apparatus 50. The processor 104 of the network entity 100 may determine location information by analyzing data of the legitimate and false fingerprint data and determining that data associated with one or more access points and/or cellular towers identified in the legitimate fingerprint data and the false fingerprint data relates to information associated with one or more corresponding or matching access points and/or cellular towers stored in the memory 106. By analyzing information associated with the matching access points and/or cellular towers, the processor 104 of the network entity may determine geographical locations of the access points and/or cellular towers and may utilize this information, in part, to determine locations corresponding to the legitimate fingerprint data and the false fingerprint data. The locations associated with the access points and/or the cellular towers may identify one or more real world locations of a corresponding access point(s) and/or cellular tower(s). For instance, the location information may, but need not, correspond to information identifying a city, country, state, region, postal/zip code, latitude coordinate, longitude coordinate(s), altitude coordinate(s), time zone, etc. corresponding to an access point(s) and/or cellular tower(s). This location information may be used by the processor 104, in part, to determine or estimate locations corresponding to the legitimate fingerprint data and/or the false fingerprint data.

The network entity 100 may send the determined location information to the network device 90 and the network device 90 may discard the location information corresponding to the false fingerprint data and may provide the location information corresponding to the legitimate fingerprint data to the fingerprint detector 78 of the apparatus 50. The location information corresponding to the legitimate fingerprint data may relate to a determined current location of the apparatus 50.

Referring now to FIG. 5, an example embodiment of a system for preserving privacy of a user and determining one or more locations of an apparatus is provided. The system 7 may include one or more access points (APs) such as, for example, a RF AP 30, a Wi-Fi AP 32, a BT AP 34 and an IR AP 36. The system 7 may also include one or more cellular towers, such as, for example, base stations (BSs) 44, 45, 46. Additionally, the system 7 may include one or more communication devices 165 and 167 (e.g., apparatuses 50 (e.g., mobile terminal 10)) as well as dedicated network devices 108 and 109 (e.g., network device 90). The system 7 may also include network devices 110 and 112 (e.g., network entity 100). In the example embodiment of FIG. 5, the dedicated network device 108 may be dedicated to providing location based services to communication device 165 and the dedicated network device 109 may be dedicated to providing location based services to communication device 167. In this regard, in one example embodiment, the dedicated network device 108 may not provide location based services to the communication device 167 and the dedicated network device 109 may not provide location based services to the communication device 165. In another alternative example embodiment, the dedicated network device 108 may provide location based services to the communication device 167 and the dedicated network device 109 may provide location based services to the communication device 165 in response to receipt of indications by the users of the communication devices 165, 167. The indications by the users of the communication devices 165, 167 may instruct the dedicated network devices 108 and 109, respectively, to share location data (e.g., fingerprint data).

Although FIG. 5 shows one RF AP 30, one Wi-Fi AP 32, one BT AP 34, one IR AP 36, three cellular towers (e.g., BS's 44, 45, 46), two communication devices 165, 167, two dedicated network devices 108, 109 and two network devices 110, 112, it should be pointed out that any suitable number of RF APs 30, Wi-Fi APs 32, BT APs 34, IR APs 36, cellular towers (e.g., BS's), communication devices 165, 167, dedicated network devices 108, 109 and network devices 110, 112 may be part of the system 7 without departing from the spirit and scope of the invention.

In the example of FIG. 5, the communication device 165 may detect signals (e.g., beacons) from one or more access points such as, for example, RF AP 30 and Wi-Fi AP 32. Additionally, the fingerprint detector 78 of the communication device 165 may detect signals from one or more cellular towers (e.g., BS's 44 and 46). The communication device 165 may analyze the data associated with the access points and the cellular towers to obtain fingerprint data which may correspond to information (e.g., radio information) that may be used to define or identify a physical place, location, area, region or the like. The information may include data associated with the received signal strengths of the respective signals received from the RF AP 30, the Wi-Fi AP 32 and the BS's 44 and 46 as well as content associated with the network addresses and/or identifiers of the RF AP 30, the Wi-Fi AP 32, and base station IDs corresponding to the BS's 44, 46. The fingerprint detector 78 may send this fingerprint data to its dedicated network device, which in this example, is dedicated network device 108. The fingerprint detector 78 may send the fingerprint data in a request along with information requesting determination of a current location of communication device 165.

The location detector 97 of the dedicated network device 108 may analyze the fingerprint data and may determine whether the data associated with the received signal strengths and the network addresses and/or identifiers of the RF AP 30, Wi-Fi AP 32 and the BS's 44, 46 relate to data identifying geographical locations. For instance, the location detector 97 may determine whether the data identifying the geographical locations are associated with network addresses and/or geographical identifiers that match or correspond to one or more of the network addresses and/or identifiers of the RF AP 30, Wi-Fi AP 32, BS 44 and/or BS 46 stored in a memory (e.g., memory 96) of the dedicated network device 108.

In response to the location detector 97 determining that locations associated with network addresses and/or identifiers that match or correspond to network addresses and/or identifiers of one or more of the RF AP 30, Wi-Fi AP 32, BS 44, BS 46 are stored in a memory of the dedicated network device 108, the location detector 97 of dedicated network device 108 may determine or estimate a location (e.g., current location) of the communication device 165. In this regard, the location detector 97 may determine or estimate the location of the communication device 165, based in part, on a location(s) of one or more of the RF AP 30, Wi-Fi AP 32, BS 44, and/or BS 46. For instance, in an example embodiment, the location detector 97 may determine that the location of an access point or a cellular tower with the strongest received signal strength is closest in proximity to the communication device 165. As such, the location detector 97 may, but need not, determine that the location of the communication device 165 corresponds to the location of the access point (e.g., Wi-Fi AP 32) or cellular tower (e.g., BS 44) with the strongest detected received signal strength. The location detector 97 of the dedicated network device 108 may provide the determined location to the fingerprint detector 78 of the communication device 165.

On the other hand, the location detector 97 may send a request to one or more of the network devices 110, 112 for the location data of the communication device 165 in an instance in which the location detector 97 determines that a memory of the dedicated network device 108 does not include any information identifying one or more geographical locations of the RF AP 30, Wi-Fi AP 32, BS 44 and/or BS 46. In this regard, the location detector 97 may include the fingerprint data (e.g., legitimate fingerprint data) received from the fingerprint detector 78, relating to the RF AP 30, Wi-Fi AP 32, BS 44, BS 46, as well as false fingerprint data in the request. The false fingerprint data, may but need not, correspond to one or more other access points and/or cellular towers. The false fingerprint data may also relate to one or more locations in the real world but may not correspond to a current location of the communication device 165. In an alternative example embodiment, in addition to including false fingerprint data in the request, the location detector 97 may also include data in the request specifying determination of a location for a large geographical area, which may serve to cloud, hide or obscure the precise location of the communication device 165 of the user.

In response to receipt of the request, one or more of the network devices 110, 112 may send a determined location corresponding to the legitimate fingerprint data and may send one or more determined locations corresponding to the false fingerprint data to the dedicated network device 108. The dedicated network device may discard the determined location(s) corresponding to the false fingerprint data and may send the determined location of the communication device 165 corresponding to the legitimate fingerprint data (e.g., the fingerprint data sent by the fingerprint detector 78 of communication device 165 to the dedicated network device 108) to the communication device 165. In this manner, the dedicated network device 108 may obscure or hide the location of the communication device 165 to the network devices 110, 112 and may preserve the privacy of the locations of a user of the communication device 165. In an instance in which the location detector 97 receives a determined location based on the legitimate fingerprint data from both network device 110 and network device 112, the location detector 97 may select one of the determined locations to provide to the communication device 165. In another alternative example embodiment, the location detector 97 may send the determined location of the communication device 165 corresponding to the legitimate fingerprint data that is received from a network device (e.g., network device 110) that is highest in a priority list. It should be pointed out that the dedicated network device 108 may store the determined location data received from one or more of the network devices 110, 112 in its memory (e.g., memory) for subsequent usage. As such, in an instance in which the fingerprint detector 78 subsequently requests determination of a location of the communication device 165, based on the same or substantially similar fingerprint data, the location detector 78 may be able to analyze a memory (e.g., memory 96) of the dedicated network device 108 and provide the fingerprint detector 78 with the corresponding determined location.

It should be pointed out that fingerprint data may change over time and that a dedicated network device operating on behalf of a communication device of a user may receive updates of fingerprint data on the user's behalf from other network devices. For example, a dedicated network device (e.g., dedicated network device 108) of a user may determine that it obtains fingerprint data updates from some other dedicated network device (e.g., dedicated network device 109) operating on behalf of another user of a communication device (e.g., communication device 167) and may generate a trigger to receive updates of fingerprint data corresponding to the location(s) of another user whenever the dedicated network device determines that its fingerprint data changes.

The dedicated network device 109 may perform functions analogous to the functions of the dedicated network device 108 with the exception that the dedicated network device 109 may perform location based services on behalf of the communication device 167 in one example embodiment. For instance, the dedicated network device 109 may determine a location of the communication device 167 or may receive a determined location of the communication device 167 from the network devices 110, 112 corresponding to legitimate fingerprint data as well as one or more determined locations corresponding to false fingerprint data. The legitimate fingerprint data may be based on fingerprint data received in a request by the dedicated network device 109 from the fingerprint detector 78 of the communication device 167. The request may include data requesting determination of a location of the communication device 167. In this regard, the legitimate fingerprint data may be based on receipt of signals, by the fingerprint detector 78 of the communication device 167, from the BT AP 34, IR AP 36, BS 45 and/or BS 46. The false fingerprint data may be included in the request, generated by the dedicated network device 109, to the network devices 110, 112 for determination of locations corresponding to the fingerprint data in the request. The dedicated network device 109 may send the request to the network devices 110, 112 in an instance in which the dedicated network device 109 may be unable to determine the location of the communication device 167. In an alternative example embodiment, a communication device (e.g., communication device 165, communication device 167) may receive valid or legitimate fingerprint data corresponding to one or more locations or places that the user of a communication device may have never been to from a dedicated network device(s) of one or more friends. In this regard, the location detector 79 of a dedicated network device (e.g., dedicated network device 108, dedicated network device 109) may utilize the fingerprint data received from the dedicated network device(s) of the friend(s) as the false fingerprint data.

In one example embodiment, in an instance in which a dedicated network device (e.g., dedicated network device 109) receives fingerprint data from a fingerprint detector 78 of a communication device (e.g., communication device 167), the location detector 97 of the dedicated network device may pre-fetch other fingerprint data associated with one or more areas near an area or region associated with the fingerprint data received by the location detector 97 from the fingerprint detector 78. The pre-fetched data may be retrieved from a memory (e.g., memory 96) of a corresponding dedicated network device or received from one or more of the network devices 110, 112. In this regard, the location detector 97 may determine geographical locations based on the pre-fetched fingerprint data. In an instance in which the fingerprint detector 78 subsequently requests determination of a location of a communication device (e.g., communication device 167) based on fingerprint data that corresponds to the pre-fetched fingerprint data, the location detector 97 may automatically provide the corresponding location of the communication device to the fingerprint detector 78. As such, the location detector 97 may provide the fingerprint detector 78 with a determined location of a communication device in a fast and efficient manner since the location detector 97 may have previously determined the location in advance of the receipt of the request by the communication device. In an example embodiment, the location detector 97 may predict locations where a user of a communication device may go to and may pre-fetch updates corresponding to the predicted locations.

In an alternative embodiment, instead of the location detector 97 of a dedicated network device (e.g., dedicated network device 108) determining the location of a communication device, the fingerprint detector 78 of a communication device (e.g., communication device 165) may provide detected fingerprint data to a location detector 97 in a request. The request may instruct the location detector 97 of a dedicated network device to provide the fingerprint detector 78 with location data associated with the provided fingerprint data. In response to the fingerprint detector 78 receiving the location data (e.g., a description of fingerprint location data), the fingerprint detector 78 may analyze the location data associated with one or more network addresses and/or identifiers of access points and/or cellular towers. In this regard, the fingerprint detector 78 of a communication device may identify geographical locations associated with the network addresses or identifiers in the location data corresponding to or matching network addresses and/or identifiers of access points or cellular towers identified in the fingerprint data. As such, the fingerprint detector 78 may determine that a location of a communication device corresponds to a location of a matching or corresponding access point or cellular tower. In one example embodiment the fingerprint detector 78 may determine that a location of the communication device corresponds to a location of an access point or cellular tower identified as having a strongest received signal strength detected by the fingerprint detector 78. In this regard, a dedicated network device may, but need not, operate as (1) a fingerprint server, determining locations on behalf of a communication device, or (2) as a fingerprint and localization server that provides location data associated with fingerprint data to the communication device, such that the communication device may determine one or more locations.

It should be pointed out that the dedicated network devices 108, 109 may provide location based services on behalf of individual users or groups (e.g., organizations) of users of communication devices. For purposes of illustration and not of limitation, an organization such as, for example, a corporation may utilize a dedicated network device to provide location based services to individuals/users utilizing communication devices within the corporation.

In another example embodiment, users of communication devices (e.g., communication devices 165, 167) may share designated detected fingerprint data and the associated determined locations with each other. In this regard, the location detectors 97 of the dedicated network devices 108 and 109 may facilitate exchange of designated fingerprint data and associated determined locations between each other across a network (e.g., network 30). As such, for purposes of illustration and not of limitation, a user of communication device 165 may utilize shared fingerprint data and determined locations detected by a communication device 167 of a user. The shared fingerprint data and determined locations of the communication device 167 may be received by the dedicated network device 108, from the dedicated network device 109. In this regard, the dedicated network device 108 may utilize the shared fingerprint data received from the dedicated network device 109 to determine locations on behalf of the communication device 165. Additionally, the dedicated network device 109 may received shared fingerprint data and determined locations of a user of communication device 165, from the dedicated network device 108. The shared fingerprint data and determined locations of the user of communication device 165 may be utilized by the dedicated network device 109 to determine one or more locations on behalf of the communication device 167.

In this regard, for purposes of illustration and not of limitation, in an instance in which a user of communication device 167 shares detected fingerprint data and associated determined locations corresponding to one or more access points of a home of the user of the communication device 167 with a user of the communication device 165, the user of the communication device 165 may also utilize the fingerprint data and associated determined locations relating to the home of the user of communication device 167.

In an example embodiment, a user of communication device may select a setting or the like to share and exchange fingerprint data and associated determined locations with other users of communication devices. For example, the communication device 165 may receive an indication of a selection to share designated fingerprint data and associated determined locations with users of other communication devices that are identified as friends of a social network (e.g., Facebook™, Twitter™, etc.). In another alternative example embodiment, a communication device(s) (e.g., communication device 165) or a user(s) may receive an indication of a selection to share designated fingerprint data and associated determined locations with one or more chosen users in a contacts list, phone book or the like of the corresponding communication device. By sharing data in this manner, the users of communication devices may control which users have access to their fingerprint data and associated determined locations. Based on a degree of relationship of a person(s) (e.g., a friend(s)) in a social network, a dedicated network device may share coarser or finer fingerprint data with a communication device of the person(s) in the social network. As such, the fingerprint data may be more blurry, less precise (e.g., coarse), or more accurate based on the degree of relationship. In this regard, the dedicated network device may enable the public to access and use only the most coarse version of fingerprint data while enabling friends to access and utilize precise versions of fingerprint data. It should be pointed out that the dedicated network device may generate blurry or less precise fingerprint data by removing at least a portion of RF data from the fingerprint data.

Referring now to FIG. 6, a flowchart of an example method for preserving privacy of a user and determining one or more locations of an apparatus is provided. At operation 600, an apparatus (e.g., network device 90, dedicated network device 108, dedicated network device 109) may receive a request to determine a location of a device (e.g., apparatus 50, communication device 165, communication device 167) based in part on fingerprint data received from the device, the fingerprint data corresponding to a generated summary of radio information identifying a physical place, a location, an area, a region or the like based on information received from one or more radio frequency (RF) devices (e.g., access points (e.g., RF AP 30, Wi-Fi AP 32, BT AP 34, IR AP 36) or cellular towers (e.g., BS 44, 45, 46)). At operation 610, the apparatus (e.g., network device 90, dedicated network device 108, dedicated network device 109) may evaluate the received fingerprint data and determine whether corresponding fingerprint data associated with at least one of the geographical locations of the RF devices is stored locally in order to determine whether to request a network device (e.g., network entity 100, network device 110, network device 112) to determine the location of the device (e.g., apparatus 50) based on providing the network device with the fingerprint data received from the device and false fingerprint data that does not correspond to a current location of the device. It should be pointed out that the apparatus (e.g., network device 90, dedicated network device 108, dedicated network device 109) may aggregate fingerprint data received on behalf of a user of a communication device (e.g., communication device 165, communication device 167) from several sources. For example, the apparatus may build up a composite set of fingerprint data corresponding to one or more entities (e.g., a building) by obtaining fingerprint data from several sources. In addition, in an instance in which there may be several sources corresponding to a discrete space, the apparatus may combine the fingerprint data received from the sources on behalf of a user of a communication device. Additionally or alternatively, the apparatus may pick the best fingerprint data received from the sources on behalf of a user of a communication device.

Optionally, at operation 610, the apparatus may determine a location of the device in response to determining that corresponding fingerprint data associated with at least one geographical location of the RF devices is stored locally. Optionally, at operation 615, the apparatus may provide the determined location to the device. Optionally, at operation 620, the apparatus may request a network device (e.g., network entity 100, network device 110, network device 112) to determine the location of the device in response to determining that the corresponding fingerprint data is not stored locally. The request may include the fingerprint data received from the device (e.g., apparatus 50, communication device 165, communication device 167) and false fingerprint data corresponding to one or more locations that do not relate to a current location of the device.

Optionally, at operation 625, the apparatus may receive the determined location of the device and the locations that do not correspond to a current location of the device. Optionally, at operation 630, the apparatus may provide the determined location to the device and may discard the locations that do not correspond to the current location of the device.

It should be pointed out that FIG. 6 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96, memory 106) and executed by a processor (e.g., processor 70, processor 94, processor 104, fingerprint detector 78, location detector 97). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 6 above may comprise a processor (e.g., the processor 70, the processor 94, processor 104, the fingerprint detector 78, the location detector 97) configured to perform some or each of the operations (600-630) described above. The processor may, for example, be configured to perform the operations (600-630) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-630) may comprise, for example, the processor 70 (e.g., as means for performing any of the operations described above), the processor 94, the processor 104, the fingerprint detector 78, the location detector 97 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a request to determine a location of a device based in part on fingerprint data received from the device, the fingerprint data corresponding to a generated summary of radio information identifying at least one of a physical place, a location, an area, or a region, the summary is based in part on information received from one or more radio frequency devices; and
   evaluating, via a processor, the received fingerprint data and determining whether corresponding fingerprint data associated with at least one geographical location of the radio frequency devices is stored locally in order to determine whether to request a network device to determine the location of the device based on providing the network device with the received fingerprint data and false fingerprint data that relates to one or more locations that are predefined not to correspond to a current location of the device.

2. The method of claim 1, further comprising:
   enabling sending of a generated request to the network device requesting the network device to determine the location of the device in response to determining that the corresponding fingerprint data is not stored locally, the generated request comprises the received fingerprint data and the false fingerprint data.

3. The method of claim 2, further comprising:
   receiving the determined location of the device and the locations that do not correspond to the current location of the device;
   discarding the locations that do not correspond to the current location of the device; and
   providing the determined location to the device.

4. The method of claim 1, further comprising:
   determining the location of the device in response to determining that the corresponding fingerprint data associated with the at least one geographical location is stored locally; and
   providing the determined location to the device.

5. The method of claim 4, wherein the determined location relates to a geographical location associated with the corresponding fingerprint data that best matches the fingerprint data received from the device.

6. The method of claim 1, wherein:
   the false fingerprint data corresponds to valid fingerprint data associated with a plurality of radio frequency devices of one or more areas related to the locations that do not correspond to the current location of the device; and
   the one or more radio frequency devices comprises one or more access points and cellular towers.

7. The method of claim 1, wherein prior to receiving, enabling provision of one or more location based services solely on behalf of the device and wherein the method further comprises:
   obscuring the current location of the device to the network device based in part on sending the network device the false fingerprint data for evaluation.

8. The method of claim 1, further comprising:
   facilitating storage of new fingerprint data and corresponding location data received from the network device in response to determining that the new fingerprint data is not locally stored in an instance in which the device requests determination of a new location of the device based in part on the new fingerprint data; and
   analyzing the newly stored fingerprint data to based on another request to determine another location of the device in response to a subsequent receipt of data from the device corresponding to the new fingerprint data.

9. The method claim 1, further comprising:
   enabling sharing of designated fingerprint data between one or more users of one or more devices in response to receipt of a selection to share the designated fingerprint data,
   wherein the designated fingerprint data relates to a generated summary of radio content identifying at least one of another physical place, another location, another area, or another region associated with detected data received from one or more different radio frequency devices.

10. The method of claim 9, wherein enabling sharing of the designated fingerprint data comprises determining that the users are friends within a social network or that at least one of the users is a contact in a contact list of the devices.

11. An apparatus comprising
    at least one processor; and
    at least one memory including computer program code configured to, with the at least one processor, cause the apparatus to perform at least the following:
       receive a request to determine a location of a device based in part on fingerprint data received from the device, the fingerprint data corresponding to a generated summary of radio information identifying at least one of a physical place, a location, an area, or a region, the summary is based in part on information received from one or more radio frequency devices; and
       evaluate the received fingerprint data and determine whether corresponding fingerprint data associated with at least one geographical location of the radio frequency devices is stored locally in order to determine whether to request a network device to determine the location of the device based on providing the network device with the received fingerprint data and false fingerprint data that relates to one or more locations that are predetermined not to correspond to a current location of the device.

12. The apparatus of claim 11, wherein the memory and computer program code are configured to, with the processor, cause the apparatus to:
    enable sending of a generated request to the network device requesting the network device to determine the location of the device in response to determining that the corresponding fingerprint data is not stored locally, the generated request comprises the received fingerprint data and the false fingerprint data.

13. The apparatus of claim 12, wherein the memory and computer program code are configured to, with the processor, cause the apparatus to:

receive the determined location of the device and the locations that do not correspond to the current location of the device;
discard the locations that do not correspond to the current location of the device; and
provide the determined location to the device.

14. The apparatus of claim 11, wherein the memory and computer program code are configured to, with the processor, cause the apparatus to:
determine the location of the device in response to determining that the corresponding fingerprint data associated with the at least one geographical location is stored locally; and
provide the determined location to the device.

15. The apparatus of claim 14, wherein the determined location relates to a geographical location associated with the corresponding fingerprint data that best matches the fingerprint data received from the device.

16. The apparatus of claim 11, wherein:
the false fingerprint data corresponds to valid fingerprint data associated with a plurality of radio frequency devices of one or more areas related to the locations that do not correspond to the current location of the device; and
the one or more radio frequency devices comprises one or more access points and cellular towers.

17. The apparatus of claim 11, wherein the memory and computer program code are configured to, with the processor, cause the apparatus to:
enable provision of one or more location based services solely on behalf of the device prior to receiving the request; and
obscure the current location of the device to the network device based in part on sending the network device the false fingerprint data for evaluation.

18. The apparatus of claim 11, wherein the memory and computer program code are configured to, with the processor, cause the apparatus to:
facilitate storage of new fingerprint data and corresponding location data received from the network device in response to determining that the new fingerprint data is not locally stored in an instance in which the device requests determination of a new location of the device based in part on the new fingerprint data; and
analyze the newly stored fingerprint data based on another request to determine another location of the device in response to a subsequent receipt of data from the device corresponding to the new fingerprint data.

19. The apparatus of claim 11, wherein the memory and computer program code are configured to, with the processor, cause the apparatus to:
enable sharing of designated fingerprint data between one or more users of one or more devices in response to receipt of a selection to share the designated fingerprint data,
wherein the designated fingerprint data relates to a generated summary of radio content identifying at least one of another physical place, another location, another area, or another region associated with detected data received from one or more different radio frequency devices.

20. The apparatus of claim 19, wherein the memory and computer program code are configured to, with the processor, cause the apparatus to enable sharing of the designated fingerprint data by determining that the users are friends within a social network or that at least one of the users is a contact in a contact list of the devices.

21. A computer program product comprising at least one non-transitory computer-readable storage medium having computer-readable program code portions stored therein, the computer-readable program code portions comprising:
program code instructions configured to cause receipt of a request to determine a location of a device based in part on fingerprint data received from the device, the fingerprint data corresponding to a generated summary of radio information identifying at least one of a physical place, a location, an area, or a region, the summary is based in part on information received from one or more radio frequency devices; and
program code instructions configured to evaluate the received fingerprint data and determine whether corresponding fingerprint data associated with at least one geographical location of the radio frequency devices is stored locally in order to determine whether to request a network device to determine the location of the device based on providing the network device with the received fingerprint data and false fingerprint data that relates to one or more locations that are predefined not to correspond to a current location of the device.

22. The computer program product of claim 21, further comprising:
program code instructions configured to enable sending of a generated request to the network device requesting the network device to determine the location of the device in response to determining that the corresponding fingerprint data is not stored locally, the generated request comprises the received fingerprint data and the false fingerprint data.

* * * * *

UNITED STATES PATENT AND TRADEMARK OFFICE
CERTIFICATE OF CORRECTION

| | | |
|---|---|---|
| PATENT NO. | : 8,594,680 B2 | Page 1 of 1 |
| APPLICATION NO. | : 13/028742 | |
| DATED | : November 26, 2013 | |
| INVENTOR(S) | : Ledlie et al. | |

It is certified that error appears in the above-identified patent and that said Letters Patent is hereby corrected as shown below:

In the claims:

Column 22,
Line 54, "predetermined" should read --predefined--.

Signed and Sealed this
Twenty-fifth Day of March, 2014

Michelle K. Lee
*Deputy Director of the United States Patent and Trademark Office*